United States Patent [19]
Tangeman et al.

[11] 4,019,685
[45] Apr. 26, 1977

[54] APPARATUS FOR SYNCHRONIZING THE SPEED OF A MATERIAL SPREADER OR THE LIKE WITH THE SPEED OF A VEHICLE UPON WHICH IT IS MOUNTED

[75] Inventors: Lawrence N. Tangeman, Beatrice; Arthur Linsenmeyer, Wymore, both of Nebr.

[73] Assignee: Dempster Industries, Inc., Beatrice, Nebr.

[22] Filed: Oct. 31, 1975

[21] Appl. No.: 627,676

[52] U.S. Cl. .................................. 239/156; 137/47
[51] Int. Cl.² .......................................... B05B 9/06
[58] Field of Search ............. 222/52, 63, 176, 178; 118/7, 8, 305; 239/155, 156; 73/507, 508; 137/47, 48

[56] References Cited
UNITED STATES PATENTS

| | | | |
|---|---|---|---|
| 2,026,814 | 1/1936 | Caldwell et al. | 137/47 X |
| 3,027,776 | 4/1962 | Snyder | 137/48 X |
| 3,233,832 | 2/1966 | Hallberg | 239/155 |
| 3,441,039 | 4/1969 | Rawson | 137/47 X |
| 3,516,427 | 6/1970 | Barnes | 137/47 |
| 3,784,100 | 1/1974 | Kirschmann | 239/156 X |

*Primary Examiner*—Stanley H. Tollberg
*Assistant Examiner*—Norman L. Stack, Jr.
*Attorney, Agent, or Firm*—Schmidt, Johnson, Hovey & Williams

[57] ABSTRACT

A mechanical cam-type apparatus is provided for ensuring even application of agricultural products or the like onto a field or the like from a moving vehicle notwithstanding variations from time to time in the ground speed of the vehicle. The apparatus includes a pair of opposed, yieldably biased-together cam members respectively coupled to the vehicle and spreading apparatus and separably rotatable in accordance with vehicle speed and the operational speed of the spreader; the cams are cooperatively configured and mounted for relative shifting movement caused by differences in the respective rotational speeds thereof, and means coupled between the cams and spreader motor is provided for variably operating the latter in response to the extent of cam shifting in order to automatically regulate spreader output in accordance with vehicle speed. In preferred forms the spreader is powered by a variable output hydraulic motor, and shunt valve apparatus actuated by the described cam shifting is provided for varying spreader output with vehicle speed.

8 Claims, 4 Drawing Figures

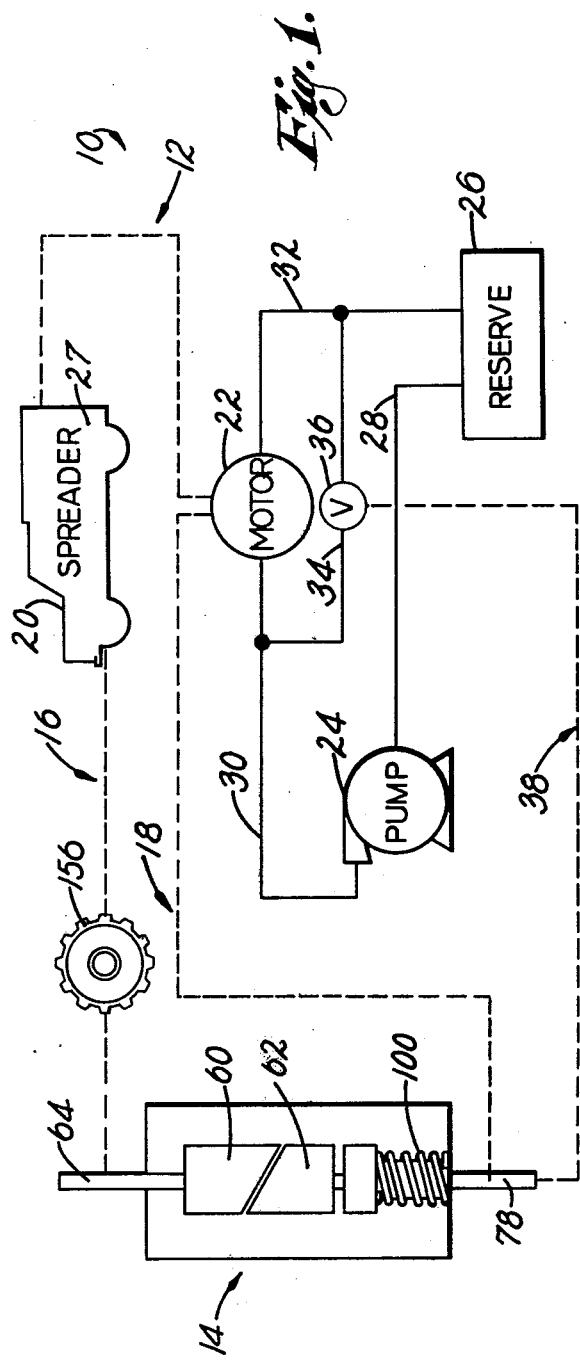
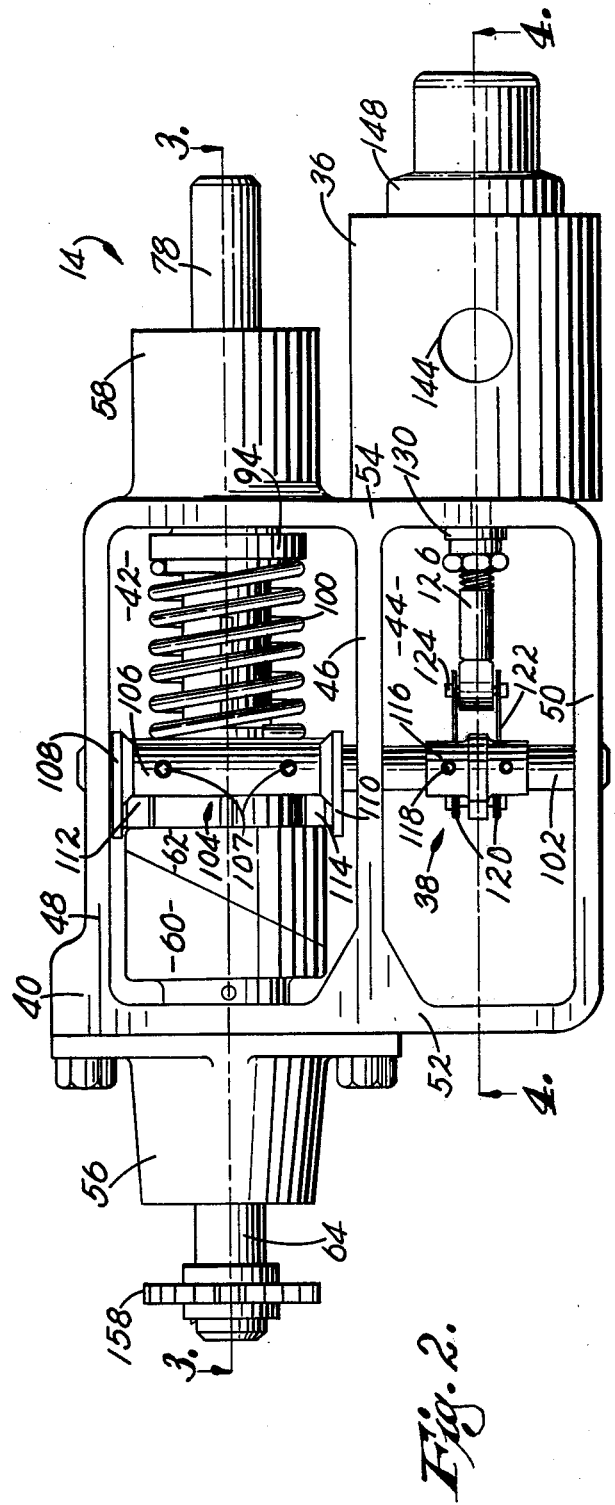

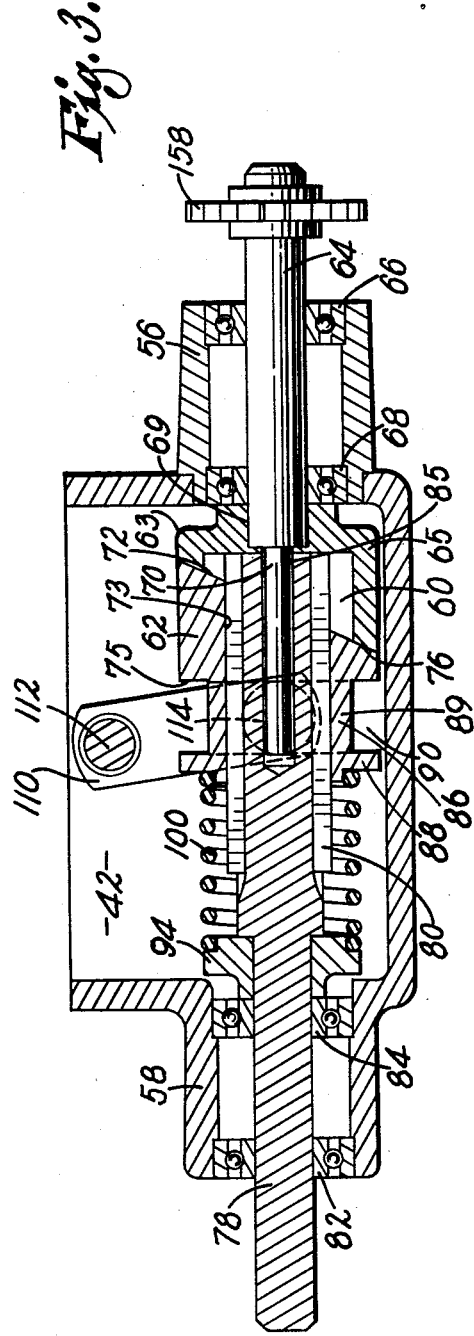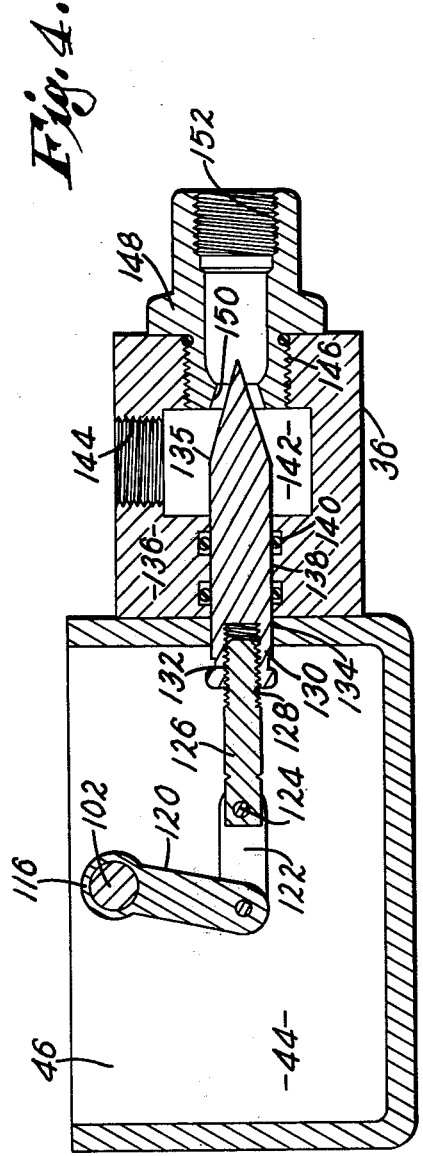

APPARATUS FOR SYNCHRONIZING THE SPEED OF A MATERIAL SPREADER OR THE LIKE WITH THE SPEED OF A VEHICLE UPON WHICH IT IS MOUNTED

This invention relates to apparatus for varying the operational speed of a vehicle-mounted spreader in accordance with vehicle speed in order to ensure even application of the material being spread at substantially all ground speeds of the vehicle. More particularly, it is concerned with a fully mechanical, cam-type apparatus for controlling vehicle spreader output without the necessity of complex and costly electronic controls and the like.

It is common practice to spread and apply solid or liquid substances onto a field or roadway using a powered vehicle having spreading means thereon. For example, agricultural products such as fertilizers and pesticides are commonly spread with vehicle-mounted units, and paving materials such as oil or the like are normally spread from a truck adapted for this purpose. In many such spreading operations, it is important that the application of material be relatively uniform and even over the entire area to be covered. In spreading agricultural pesticides for instance, it is important not to overapply the pesticide to certain areas of the field since this may result in crop or soil injury and waste expensive material.

In all such spreading operations, the amount of material applied per unit acre of field or roadway necessarily depends upon the operational speed of the material dispenser, and on the ground speed at which the vehicle is travelling. Thus, in order to ensure even application during both constant and varying vehicle ground speeds it is necessary to provide some mechanism for controlling the operational speed of the spreader in accordance with vehicle speed. While in many cases spreader operation will desireably be directly proportional to vehicle speed, i.e., as the vehicle travels at higher rates of speed the output of the spreader is proportionally increased, in some applications nonlinear spreader response to vehicle speed may be preferable.

While it is possible to achieve the proper coordination between vehicle ground speed and operational speed or output of the spreader primarily through the use of electronic control circuitry, this approach is generally not favored by virtue of the cost and complexity of such apparatus. As can be appreciated, spreader vehicles of the type used in agricultural or road paving work are subjected to hard usage which is not conducive to maintenance of delicate electronic control circuitry in operative working order. Therefore, it is desirable with such units to employ fully mechanical control apparatus which is generally sturdier and easier to service and maintain.

The patent of Rawson, U.S. Pat. No. 3,441,039 discloses the use of a screw and nut arrangement for speed synchronization between a vehicle and a material spreader carried thereby. The following U.S. Pats. are also of background interest in connection with vehicle-spreader synchronization devices: U.S. Pat. Nos. 979,802, 2,026,814, 2,468,459, 2,761,669, 2,874,711, and 3,233,832.

The most important object of the present invention is to provide a mechanical, cam-type apparatus for evenly spreading material from a moving vehicle in accordance with the ground speed thereof and which eliminates the need for costly and complex electronic control circuitry and ensures even spreading of material from a moving truck or other vehicle notwithstanding variations from time to time in the ground speed thereof.

Another object of the invention is to provide apparatus of the type described which includes a pair of abuttably engaged, biased-together rotatable cam members which are respectively coupled to the vehicle and spreader for rotation thereof in accordance with vehicle speed and the operational speed of the spreader; the engaged faces of the respective cam members are cooperatively configured for causing variable relative "riding" or shifting movement therebetween when the cams are rotated at varying differential rotational speeds; and control means is provided for detecting the extent of relative movement between the cam members and varying the operational speed of the spreader in response to such extent of relative cam movement so that even material application is assured during substantially all phases of vehicle operation.

A still further object of the invention is to provide dual cam-type control apparatus wherein the engaged faces of the cams are mutually complemental and obliquely oriented so that during differential rotational speeds of the cam members at least one of the latter can shift relatively or ride up or down the face of the remaining cam in order to produce the desired shifting movement between the two cams.

In the drawings:

FIG. 1 is a schematic representation of the preferred overall spreading and control apparatus in accordance with the invention;

FIG. 2 is an elevational view of the dual cam control apparatus which serves to coordinate vehicle ground speed and operational speed of the spreader;

FIG. 3 is a sectional view taken along line 3—3 of FIG. 2 and illustrating in detail the dual-cam arrangement of the present invention; and FIG. 4 is a sectional view taken along line 4—4 of FIG. 2 and depicting the yoke-controlled valve assembly for controlling the operational speed and thereby the material output of the material spreader.

Turning now to the drawings, FIG. 1 is a schematic illustration of preferred apparatus 10 in accordance with the invention which broadly includes a selectively actuatable, variable output spreader assembly 12, mechanical cam-type control assembly 14, and means 16 and 18 for operatively coupling the respective ends of assembly 14 with a truck or other vehicle 20 and spreader assembly 12.

In more detail, spreader assembly 12 includes a variable output hydraulic motor 22, a conventional pump 24, and a hydraulic fluid reservoir 26. Motor 22 serves to drive conventional, vehicle-mounted, material dispensing or applying apparatus schematically depicted at 27 in FIG. 1. Apparatus 27 can be of any well-known type, for example an auger or fluid type applicator. A line 28 extends between reservoir 26 and the input side of pump 24, and a line 30 is interconnected between the output side of pump 24 and the input of hydraulic motor 22. An output line 32 is also connected between the output of motor 22 and reservoir 26 for completing the hydraulic loop. In addition, a shunt line 34 is interconnected between lines 30 and 32 and has a variable needle valve 36 interposed therein. Schematically illustrated control means 38 extends between the end of control assembly 14 connected to motor 22 and valve 36 for controlling the latter, as will be explained in more detail hereinafter.

Turning now to FIGS. 2–4, it will be seen that in practice control assembly 14, control means 38 and valve 36 are constructed as a unit which includes a housing 40 presenting adjacent compartments 42 and 44 separated by a central wall 46. Housing 40 also includes a pair of spaced side walls 48 and 50, and respective end walls 52 and 54. A pair of elongated, opposed, generally tubular extensions 56 and 58 having open ends respectively extend beyond end walls 52 and 54 in juxtaposition and communication with compartment 42. Finally, valve 36 is mounted on wall 54 adjacent extension 58 and in juxtaposition to compartment 44.

Control assembly 14 also includes a pair of opposed, abuttably engaged cam members 60 and 62 of specialized configuration. Member 60 is of generally annular, cuplike configuration and includes a circular bottom wall 63 and a continuous, annular transversely obliquely cut sidewall 65. Member 60 is mounted upon elongated shaft 64 for rotation in unison therewith but is fixed against axial movement longitudinally of the shaft 64. The latter extends between the aligned bearing assemblies 66 and 68 mounted within the opposed ends of extension 56 (see FIG. 3) and is received within a complemental central bore 69 in the circular bottom wall 63 of cam member 60. In addition, an axially extending, rod-like member 70 extends from the end of rod 64 received within bore 69 through wall 63 and beyond annular wall 65.

The engagement face of cam member 60 defined by the edge of sidewall 65 remote from wall 63 is configured to present an oblique, substantially uniform, planar surface 72.

Shiftable cam member 62 is in the form of a generally annular block having a central bore 73, a planar, transversely extending upper surface 75, and a planar, obliquely oriented engagement face 76 which is complemental with annular surface 72 of cam member 60. Member 62 is mounted on an elongated rotatable shaft 78 by means of cylindrical key 80 so that cam 62 rotates with shaft 78 and is axially shiftable along the length thereof. As best illustrated in FIG. 3, shaft 78 is of a length to extend from a point somewhat beyond face 76 and through compartment 42 and the opposed bearing assemblies 82 and 84 mounted within extension 58. In addition, the end of shaft 78 adjacent cam member 62 is adapted for engaging the proximal face of wall 63 and is bored as at 85 for telescopically receiving rod-like member 70 forming a part of shaft 64.

Annular track-defining structure 86 is mounted on key 80 adjacent cam member 62 and includes an annular, radially enlarged lip 88 and an axially extending inner wall 89. Structure 86 defines an annular track 90 between the adjacent, annular, generally planar surfaces 75 of cam member 62 and lip 88.

Bushing structure 94 is mounted within compartment 42 adjacent end wall 54 and is centrally apertured as at 96 for receiving shaft 78. In addition, the surface of bushing structure 94 remote from wall 54 is configured to present an annular spring-receiving groove 98. A helical biasing spring 100 is mounted between groove 98 and the face of lip 88 remote from track 90 in order to bias cam member 62 into engagement with cam member 60 along the respective engagement surfaces 76, 72 thereof. By virtue of this construction it will be seen that cam member 62 is not only rotatable with shaft 78 but also axially shiftable relative thereto along the length of key 80.

Control means 38 includes an elongated rotatable shaft 102 which extends transversely between housing walls 48 and 50 and through an aperture in wall 46 in crossing relationship to internal compartments 42 and 44. A pivotal yoke assembly 104 is supported on shaft 102 and includes a tubular member 106 positioned over shaft 102 and fixed thereto by means of fittings 107. Assembly 104 also includes a pair of spaced, inwardly extending yoke arms 108 and 110. As best shown in FIGS. 2–3, each yoke arm has a respective roller 112 and 114 rotatably affixed adjacent the innermost end thereof and rotatably positioned within annular track 90. In this manner, shaft 78, track-defining structure 86 and cam member 62 are freely rotatable with respect to yoke arms 108 and 110, but the latter are pivotal in response to axial shifting of cam member 62 along the length of shaft 78.

Rotatable shaft 102 also carries a tubular crank fitting 116 within compartment 44 which is fixedly secured to shaft 102 by means of fitting 118. A pair of spaced-apart crank arms 120 are carried by crank fitting 116 and extend inwardly therefrom. A pair of arms 122 are pivotally connected to the innermost ends of crank arms 120 and have a transverse pivot pin 124 extending therebetween at a point remote from crank arms 120.

A valve-actuating shaft 126 is pivotally supported on pin 124 and is threaded at the remaining end thereof as at 128. An elongated valving element 130 is coupled to shaft 126 by means of a threaded, axially extending bore 132 which receives the threaded end of shaft 126. Element 130 extends through an aperture 134 in wall 54 and into valve 36 and has a generally conical, tapered end 135 therewithin.

Valve 36 includes a housing block 136 provided with an elongated, valve element-receiving bore 138 which is sealed by provision of a pair of spaced O-rings 140. Housing block 136 also defines a central hollow space 142 and a pair of spaced, internally threaded bores 144 and 146 which are each in communication with space 142. Bore 144 is adapted to receive the inlet end of shunt line 34, and a complementally threaded valve fitting 148 is mounted within bore 146. Fitting 148 includes a fluid inlet bore 150 of generally frustoconical configuration, and a spaced, internally threaded outlet opening 152 which is adapted to receive the outlet end of shunt line 34.

As seen in FIG. 4, the tapered end 135 of valve element 130 is complemental with the adjacent tapered wall of frustoconical bore 150. It will thus be readily apparent that movement of valve element 130 has the effect of metering the amount of fluid allowed to pass through fitting 148 and out outlet bore 152 thereof. Valve element 130 is selectively shiftable between a position as illustrated in FIG. 4 wherein substantial fluid flow is permitted through bore 150, to a closed position wherein such fluid flow is essentially precluded.

As discussed above, the respective ends of control assembly 14 are operatively coupled with vehicle 20 and spreader assembly 12 in order to control the output of the latter in accordance with vehicle speed. In this regard shaft 64 carrying valve element 60 is preferably coupled to a wheel of vehicle 20 by means of a conventional gear drive which is schematically illustrated as at 156 in FIG. 1, and includes a gear 158 coupled to the outermost end of shaft 64 (see FIGS. 2 and 3). Similarly, coupling means 18 between shaft 78 and motor 22 of spreader assembly 12 is also preferably in the form of a conventional gear drive. As will be appreciated, the respective gear drives between the ends of control assembly 14 ensure that in preferred form of the invention the cam members 60 and 62 are driven in direct proportion with, respectively, vehicle speed and the operational speed of spreader assembly 12. It is to be understood however, that other conventional mechanical or electrical coupling means could also be employed to good effect in the invention, if, for example, it is desired to control spreader output in a manner other than proportionally with vehicle speed.

Furthermore, although the conventional gear drives discussed above in general give directly proportional driving of the cam members 60 and 62, certain deviations from direct proportionality may result as an inherent feature of the dual cam arrangement. Such deviations may result from the effects of momentum during speed changes, non-linear response of the coil spring 100, and frictional forces developed between the cam faces. However, the rotational speed of each of the cam members is related to and varies in general correspondence with, respectively, the speed of the vehicle and the speed of motor 22.

During constant speed material application procedures with vehicle 20 and spreader assembly 12, the respective cam members 60 and 62 are rotated through shafts 64 and 78 at a speed in accordance with vehicle ground speed and the operational speed of spreader assembly 12. Depending upon the differential between the rotational speeds of the respective cam members, the latter will assume a relatively stationary rotational configuration wherein surface 76 of cam member 62 will be in engagement with surface 72 of cam member 60 at any one of a number of positions along the extent of surface 72. However, when vehicle speed is increased from a relatively constant rate, the rotational speed of cam member 60 is correspondingly increased which in turn causes member 62 to ride up the engagement surface of cam member 60 against the bias of spring 100. Similarly, when vehicle speed is decreased spring 100 pushes cam member 62 toward the fully engaged position depicted in FIG. 3. In general cam member 61 is movable between the position shown in FIG. 3 and a fully extended position wherein the cam members are in engagement at the respective areas thereof of greatest axial dimensions; of course, in all operational configurations the cam members 60 and 62 are in at least partial engagement.

During the described riding motion of cam member 62 relative to cam member 60 when vehicle speed is increased, the respective yoke arms 108 and 110 are pivoted about the axis presented by shaft 102 by virtue of the rollers 112 and 114 which are captured between surface 75 of cam 62 and lip 88. Such pivotal movement of arms 112 and 114 serves to correspondingly rotate shaft 102 and crank fitting 116 connected thereto. This in turn causes shaft 126 to advance valve element 130 to the right as viewed in FIG. 4 so that fluid flow through fitting 148 (and thus through shunt line 34) is progressively closed. Closing of shunt line 34 causes more of the output of pump 24 to be delivered to hydraulic motor 22 which therefore increases the output of spreading assembly 12 until proper coordination between vehicle speed and spreader output is achieved, at which point the engaged cams assume another relatively stationary rotational configuration.

In the event that vehicle 20 slows down from a given speed, the above described action is reversed by virtue of a corresponding slowdown in the rotational speed of cam member 60 and a spring-biased riding down of cam member 62. This causes a reverse pivoting movement of the yoke arms which in turn retracts valve element 130 and opens shunt line 34 to a greater extent. This of course slows the output of motor 22 since hydraulic fluid in line 30 in part passes through shunt line 34 and back to reservoir 26, as opposed to passage through motor 22.

It will thus be seen that the apparatus of the present invention provides a servomechanism for controlling the output of spreader assembly 12 in accordance with vehicle speed. The respective cam member 60 and 62 are preferably configured so that during conventional, low speed material applications cam member 62 will ride approximately half way "up" the engagement surface of cam 60 and thus be shifted about 90 degrees out of the position illustrated in FIG. 3. This in turn leaves valve 36 open part way and permits quick, smooth transitional operation of spreader assembly 12 in the event of either a speed up or slowdown in the ground speed of vehicle 20. However, it will be readily appreciated that other configuratons of the cam members 60 and 62 could also be employed. Moreover, while in the preferred embodiment valve 36 is positioned in shunt relationship to motor 22, it will be apparent to those skilled in the art that a series related valve assembly could also be used.

Having thus described the invention, what is claimed as new and desired to be secured by Letters Patent is:

1. Apparatus for evenly spreading material from a spreader vehicle having mobilizing means including ground-engaging wheel means, said apparatus comprising:
   selectively actuatable, variable output spreading means for spreading said material during travel of said vehicle and including hydraulic motor means and material-dispensing apparatus coupled to the motor means;
   means for controlling the output of said spreading means for ensuring substantially even application of said material onto a field or the like during travel of the vehicle at constant and varying speeds, including:
   a first rotatable cam member;
   means operatively coupling said first cam member and said mobilizing means of said vehicle for rotation of the first cam member in response to travel of the vehicle and at a rotational speed related to and varying in general correspondence with the travel speed of said vehicle;
   a second rotatable cam member;
   means operatively coupling said second cam member and said motor means of said spreading means for rotation of the second cam member in response to the operation of said motor means and at a rotational speed and related to and varying in general correspondence with the operational speed of the motor means;
   means mounting said first and second cam members in biased-together engagement and permitting relative shifting movement therebetween,
   said first and second cam members having respective, oblique engagement surfaces and being cooperatively configured for causing variable relative shifting movement therebetween while remaining in at least partial engagement when the respective cam members are rotated at varying differential rotational speeds;

shiftable structure located adjacent said first and second cam members and engageable by one of the latter during said relative shifting movement of the cam members for shifting of said structure in response to the relative shifting of the cam members;

valve means including a movable valving element operably coupled to said hydraulic motor means for controlling the operational speed of the latter; and means connecting said shiftable structure and said valving element for movement of the element in response to said shifting of the shiftable structure for regulating the amount of hydraulic fluid delivered to the motor means to thereby control the output of the material-dispensing apparatus and to coordinate said output with vehicle speed.

2. Apparatus as set forth in claim 1 wherein said means operatively coupling said first cam member and said mobilizing means is coupled to a wheel means of said vehicle.

3. Apparatus as set forth in claim 1 wherein said shiftable structure comprises a pivotally mounted yoke positioned adjacent one of said cam members.

4. Apparatus as set forth in claim 1 wherein said valve means is interposed in a shunt conduit, the latter being connected at respective ends thereof to the input and output lines of said hydraulic motor means.

5. Apparatus as set forth in claim 1 wherein each of said first and second cam members are generally annular members mounted on corresponding, elongated, axially rotatable first and second shafts with the respective ends of the annular walls of said cams being in engagement.

6. Apparatus as set forth in claim 5 wherein said first shaft has an axial extension extending beyond said first cam member, and said second shaft is complementally bored for receiving said extension.

7. Apparatus as set forth in claim 6 including means mounting said first shaft and cam member against axial shifting movement, and means mounting said second cam member for axial shifting movement thereof.

8. Apparatus as set forth in claim 7 including spring means about said second shaft for yieldably biasing the respective ends of said annular cam walls into engagement.

* * * * *